United States Patent
Mizuma et al.

(10) Patent No.: US 7,434,871 B2
(45) Date of Patent: Oct. 14, 2008

(54) LOWER VEHICLE BODY STRUCTURE OF VEHICLE

(75) Inventors: Takashi Mizuma, Hiroshima (JP); Naomune Moriyama, Hiroshima (JP)

(73) Assignee: Mazda Motor Corporation (JP)

( * ) Notice: Subject to any disclaimer, the term of this patent is extended or adjusted under 35 U.S.C. 154(b) by 0 days.

(21) Appl. No.: 11/598,660

(22) Filed: Nov. 14, 2006

(65) Prior Publication Data

US 2007/0126264 A1 Jun. 7, 2007

(30) Foreign Application Priority Data

Dec. 1, 2005 (JP) .............................. 2005-347414

(51) Int. Cl.
B62D 25/20 (2006.01)

(52) U.S. Cl. ............... 296/193.07; 296/209; 296/65.13; 296/204

(58) Field of Classification Search ................ 296/204, 296/209, 193.07, 65.13, 65.14
See application file for complete search history.

(56) References Cited

U.S. PATENT DOCUMENTS

| | | | | |
|---|---|---|---|---|
| 3,132,891 A | * | 5/1964 | Pyuro et al. | 296/204 |
| 3,919,926 A | | 11/1975 | Yamada | |
| 4,493,506 A | * | 1/1985 | Alexander | 296/209 |
| 4,747,636 A | * | 5/1988 | Harasaki et al. | 296/181.4 |
| 4,842,318 A | * | 6/1989 | Fussnegger et al. | 296/64 |
| 5,020,846 A | * | 6/1991 | Bonnett | 296/181.4 |
| 6,129,412 A | * | 10/2000 | Tanuma | 296/204 |
| 6,476,435 B1 | * | 11/2002 | Hitzelberger | 296/64 |
| 7,252,318 B2 | * | 8/2007 | Sumida et al. | 296/64 |
| 2005/0194818 A1 | | 9/2005 | Odaka et al. | |
| 2005/0218683 A1 | * | 10/2005 | Toyota et al. | 296/64 |

FOREIGN PATENT DOCUMENTS

| | | |
|---|---|---|
| EP | 0 494 552 A1 | 7/1992 |
| EP | 1 582 397 A1 | 10/2005 |
| JP | 2000-203449 | 7/2000 |
| JP | 2005-219521 | 8/2005 |
| JP | 2005-247003 | 9/2005 |

OTHER PUBLICATIONS

European Partial Search Report dated Feb. 14, 2007 Application No. EP 06 02 3385.

* cited by examiner

*Primary Examiner*—Dennis H Pedder
(74) *Attorney, Agent, or Firm*—Studebaker & Brackett PC; Donald R. Studebaker

(57) ABSTRACT

There is provided a lower vehicle body structure, in which a floor panel is provided between a pair of side sills extending longitudinally, a tunnel portion extending longitudinally is provided at a central portion of the floor panel, and a seat is provided between the side sill and tunnel portion, wherein there are provided a seat support member outer to support the seat, which extends longitudinally inside the side sill, and a plurality of cross members extending in the vehicle width direction with a specified distance therebetween longitudinally, outside end portions of which are connected to the seat support member outer and inside end portions of which are connected to the tunnel portion. Accordingly, both layout of the seat and sufficient vehicle body rigidity against a vehicle side crash can be provided.

7 Claims, 16 Drawing Sheets

LOWER VEHICLE BODY STRUCTURE OF VEHICLE

BACKGROUND OF THE INVENTION

The present invention relates to a lower vehicle body structure of a vehicle, in which a floor panel is provided between a pair of side sills extending longitudinally, a tunnel portion extending longitudinally is provided at a central portion of the floor panel, and a seat for a passenger is provided between the side sill and the tunnel portion.

Conventionally, the structures disclosed in Japanese Laid-Open Publication Nos. 2005-247003 and 2000-203449 are known as the above-described lower vehicle body structure.

In these structures disclosed in the above publications, a pair of side sills extending longitudinally is provided, a floor panel is provided between these side sills, a tunnel portion extending longitudinally is provided at a central portion of the floor panel, a plurality of cross members extending in a vehicle width direction are provided on the floor panel with a specified distance therebetween longitudinally so as to interconnect the side sill and the tunnel portion, and a pair of seat rails is provided between front and rear cross members so as to guide a seat for a passenger longitudinally.

These conventional structures have a problem in that a rigidity of the vehicle body would not be sufficient against a vehicle side crash. Further, in the vehicle body structures disclosed in the above publications, which have a centre pillar, a so-called belt-in seat (a type of seat equipped with a retractor to wind up a seatbelt therein) may be generally applied in a case where a center-pillar-less vehicle body is adopted for providing passengers with easy ingress and egress. Herein, the structure in which loads applied to the seat and seatbelt are configured to be transmitted to the cross members has a problem in that the cross members would be deformed improperly at the vehicle crash.

Meanwhile, another type of lower vehicle body structure of a vehicle shown in FIG. 16 is also known. Namely, this is a structure, as shown in the figure, in which a pair of side sills 100, 100 extending longitudinally are provided, a floor panel 101 is provided substantially horizontally between the side sills 100, 100, a tunnel portion 102 is provided at a central portion of the floor panel 101 so as to project toward the inside of the vehicle and extend longitudinally.

Further, there are provided pocket lower rails 103, 103 inside the side sills 100, 100 so as to extend longitudinally and partially, cross members 104, 104 are provided at a front portion on the floor panel 101 so as to respectively interconnect the side sill 100 and the tunnel portion 102 in the vehicle width direction, and cross members 105, 105 are provided at a rear portion on the floor panel 101 so as to respectively interconnect the pocket lower rail 103 and the tunnel potion 102 in the vehicle width direction.

Also, between the cross members 104, 105 is provided a pair of seat rails 106, 106 to guide a seat for a passenger longitudinally.

The structure shown in FIG. 16 may have a more increased vehicle body rigidity because of the pocket lower rails 103, compared with the structures disclosed in the above patent publications. However, the rigidity would not be sufficient yet against the vehicle side crash or the like.

Also, since the pair of seat rails 106, 106 interconnects the front and rear cross members 104, 105, there is still a problem in that the cross members would be improperly deformed at the vehicle crash or the like in a case where the vehicle is the so-called center pillar-less one equipped with the belt-in seat.

SUMMARY OF THE INVENTION

The present invention has been devised in view of the above-described problems, and an object of the present invention is to provide a lower vehicle body structure of a vehicle that can provide both a proper layout of the seat and a sufficient vehicle body rigidity.

According to the present invention, there is provided a lower vehicle body structure of a vehicle, in which a floor panel is provided between a pair of side sills extending longitudinally, a tunnel portion extending longitudinally is provided at a central portion of the floor panel, and a seat for a passenger is provided between the side sill and the tunnel portion, the lower vehicle body structure comprising a seat support member outer to support the seat, which extends longitudinally inside the side sill, and a plurality of cross members extending in a vehicle width direction with a specified distance therebetween longitudinally, outside end portions of which are respectively connected to the seat support member outer and inside end portions of which are respectively connected to the tunnel portion.

According to the above structure, since the seat support member outer is configured such that it extends longitudinally inside the side sill (vehicle body rigidity member) and the seat is attached to the seat support member outer, the seat can be provided with a properly increased rigidity.

Also, since the plural cross members (vehicle body rigidity member) are provided between the seat support member outer and the tunnel portion (vehicle body rigidity member) with the specified distance therebetween longitudinally, the vehicle body rigidity can be ensured against a vehicle side crash. Namely, both the proper layout of the seat and the sufficient vehicle body rigidity at the vehicle side crash can be provided.

Further, since loads applied to the seat and seatbelt are configured to be transmitted to the seat support member outer, side sill, cross members and tunnel portion (vehicle body rigidity members), the cross members can be properly prevented from being improperly deformed at the vehicle side crash.

According to an embodiment of the present invention, the lower vehicle body structure of a vehicle further comprises a seat support member inner to support the seat, which extends longitudinally along the tunnel portion, wherein the inside end portions of the cross members are connected to the tunnel portion via the seat support member inner.

Thereby, since the plural cross members provided with the specified distance therebetween longitudinally are connected to the seat support member outer provided along the side sill and the seat support member inner provided along the tunnel portion, the rigidity of the vehicle body rigidity can be properly increased and the resistance against the vehicle side crash can be improved. Also, since the seat is attached to the seat support member outer and the seat support member inner, an attaching rigidity of the seat can be increased.

According to another embodiment of the present invention, the cross members are configured such that a cross section of the one located at a rear side has a smaller area than that of the one located at a front side.

Thereby, since the cross member is made smaller, ensuring the seat layout and the sufficient vehicle body rigidity against the vehicle side crash, a sufficiently large foot space for a passenger seated in a rear seat can be ensured.

According to another embodiment of the present invention, seat rails for the seat are attached to the seat support member outer and the seat support member inner.

Thereby, the seat rails are attached for a slide-type seat, and both a seat slide and the sufficient vehicle body rigidity can be attained. In particular, since the seat rails are respectively attached to the seat support member outer and the seat support member inner that extend longitudinally, fixing of the seat rails to a proper position can be attained even if they are fixed to plural portions via members such as bolts and nuts.

According to another embodiment of the present invention, there is provided a tunnel member extending longitudinally along the tunnel portion, and the seat support member inner is connected to the floor panel and the tunnel member.

Thereby, since the seat support member inner is connected to the floor panel and the tunnel member that can increase rigidities of the floor and the vehicle body, the seat attaching rigidity and the vehicle body rigidity against the vehicle side crash can be further increased.

According to another embodiment of the present invention, at a rear portion of the floor panel is provided a kick-up portion to project upward, and a rear end portion of the seat support member outer is connected to a front wall of the kick-up portion.

Thereby, since the seat support member outer is connected to the kick-up portion having a high rigidity, the vehicle body rigidity can be further increased, and the loads applied to the seat and seatbelt can be transmitted not only to the seat support member outer, side sill, cross members, tunnel portion, but also to the kick-up portion. Further, the above seat support member outer is connected to the side sill and the kick-up portion, which are the vehicle body rigidity members, the sufficient vehicle body rigidity can be ensured.

According to another embodiment of the present invention, at a rear portion of the floor panel is provided a kick-up portion to project upward, and a rear end portion of the seat support member inner is connected to a front wall of the kick-up portion.

Thereby, since the seat support member inner is connected to the kick-up portion having the high rigidity, the vehicle body rigidity can be further increased, and the loads applied to the seat and seatbelt can be transmitted not only to the seat support member outer, seat support member inner, side sill, cross members, tunnel portion, but also to the kick-up portion. Further, the above seat support member inner is connected to the tunnel portion and the kick-up portion, which are the vehicle body rigidity members, the sufficient vehicle body rigidity can be ensured.

According to another embodiment of the present invention, an ingress and egress opening without a partition is formed beside the floor panel.

The ingress and egress opening without a partition, namely without a center pillar, can provide passengers with easy ingress and egress, but the vehicle body rigidity may be deteriorated by providing the ingress and egress opening without the partition. However, the desirable vehicle body rigidity can be ensured by applying the above-described structure.

According to another embodiment of the present invention, the seat includes a retractor to wind up a seatbelt therein.

Thereby, even if the seat equipped with the retractor to wind up the seatbelt, namely, a belt-in type of seat, is applied, the loads applied to the seat and seatbelt can be properly transmitted to the seat support member outer, side sill, cross members, tunnel portion that are vehicle body rigidity members.

Other features, aspects, and advantages of the present invention will become apparent from the following description which refers to the accompanying drawings.

DETAILED DESCRIPTION OF THE INVENTION

Figure 1:
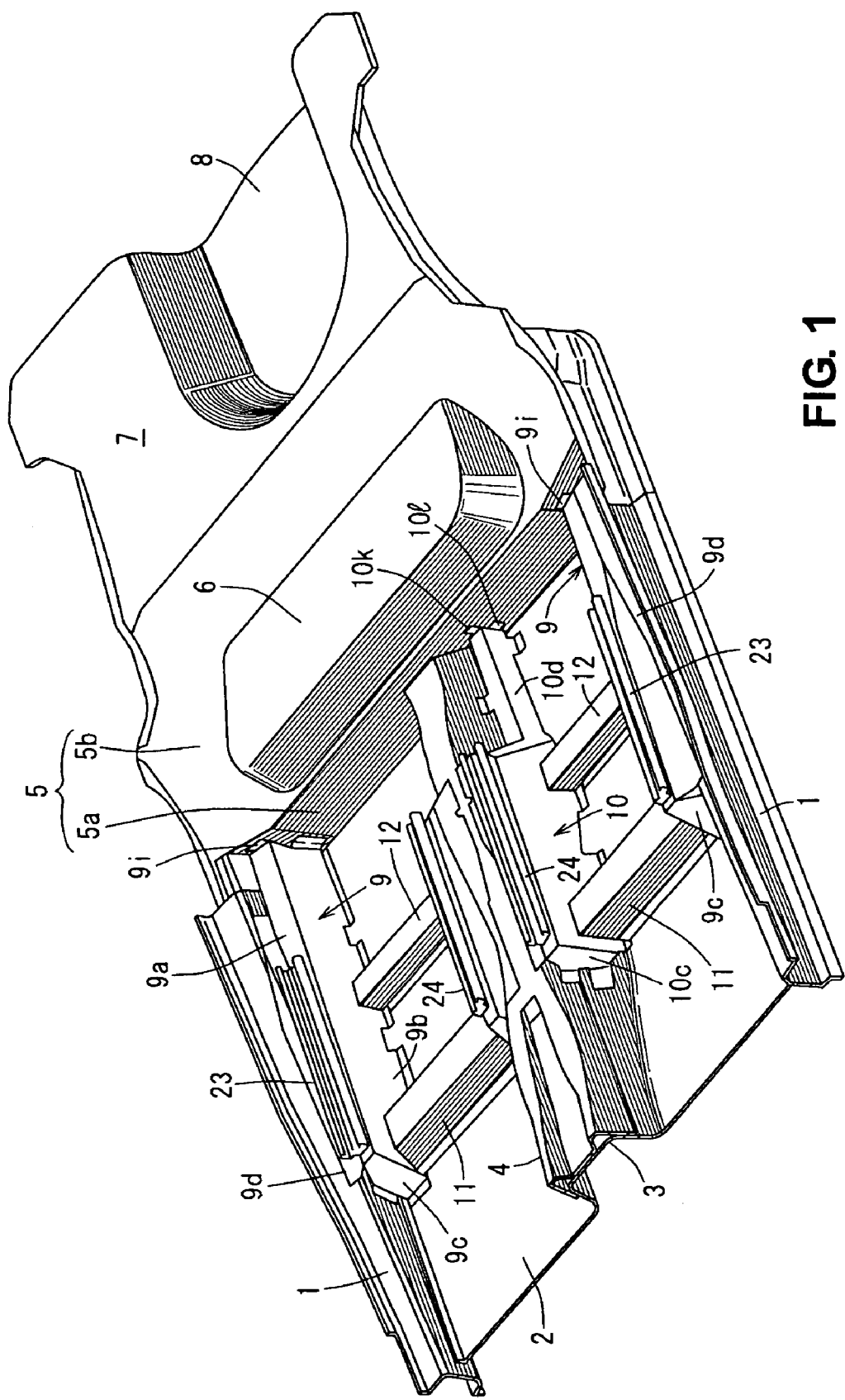
FIG. 1 is a perspective view of a lower vehicle body structure of a vehicle of the present invention.
Figure 2:
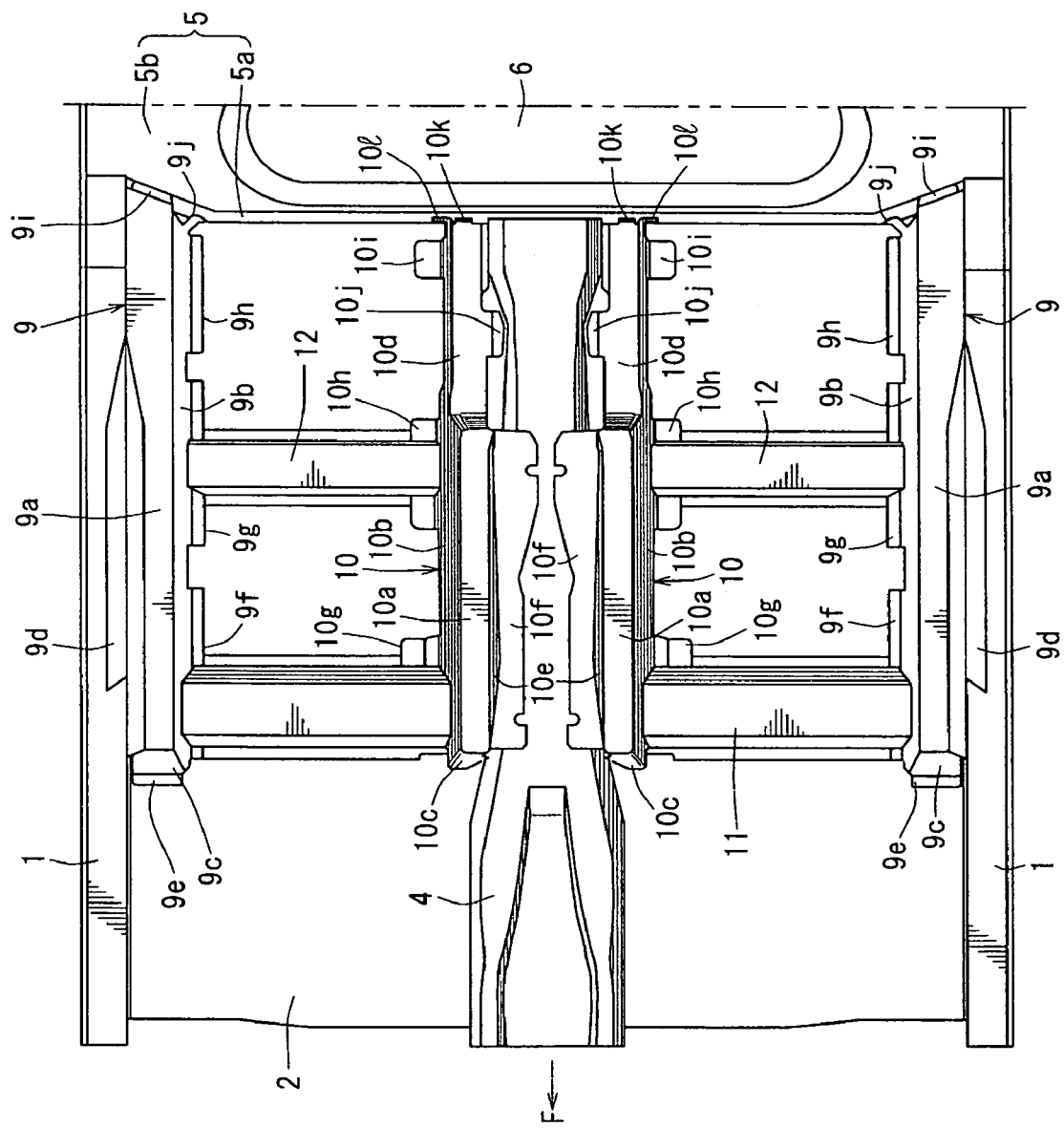
FIG. 2 is a plan view of a major portion of FIG. 1.
Figure 3:
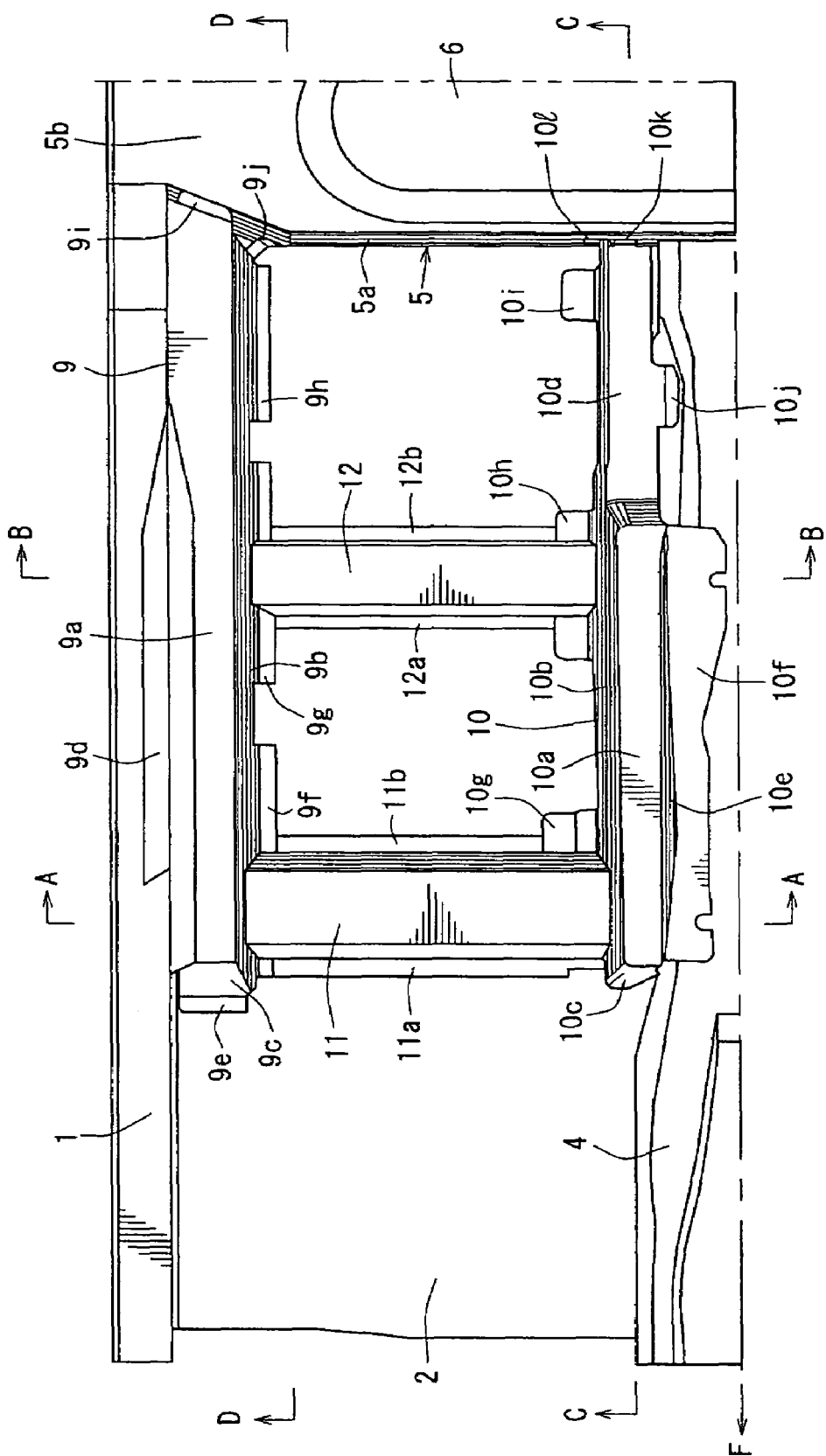
FIG. 3 is an enlarged plan view of a right-half vehicle body structure.

Hereinafter, preferred embodiments of the present invention will be described referring to the accompanying drawings. The figures show a lower vehicle body structure of a vehicle. FIG. 1 is a schematic perspective view showing an entire part of the lower vehicle body structure, FIG. 2 is a plan view of a major portion of FIG. 1, and FIG. 3 is an enlarged plan view of a right-half vehicle body structure of FIG. 2. In these figures, between a pair of floor panels 1, 1 (only a pair of side sill inners is illustrated in FIGS. 1-3) that extends longitudinally at both sides of the vehicle is provided a floor panel 2 substantially horizontally, which forms a lower face (floor face) of the vehicle body.

A tunnel portion 3, which projects upward and extends longitudinally, is formed integrally to a central portion of the floor panel 2. A tunnel member 4 (so-called high-mount backbone frame) is provided at a top of the tunnel portion 3 so as to extend longitudinally along the tunnel portion 3.

The tunnel member 4 is a body rigidity member to increase rigidity of a floor and body. Herein, the tunnel member 4 may be formed with a single member that extends from a dash lower panel to a kick-up portion 5, which will be described below, or with two members that are split into a front one and a rear one.

At a rear portion of the floor panel 2 is provided the kick-up portion 5 to project upward. The kick-up portion 5 includes a front wall 5a that projects upward from the rear portion of the floor panel 2 and a kick-up floor portion 5b that extends rearward from an upper end of the front wall 5a.

A projecting portion 6 is provided on the kick-up floor portion 5b so as to project upward along substantially an entire width of the floor portion. A top deck face of the projecting portion 6 is formed in a flat shape for an attachment of a rear seat. Below the projecting portion 6 is provided a large space for a layout space of auxiliary components, such as a fuel tank.

Also, a rear floor 7 is connected to a rear end of the kick-up floor portion 5b so as to extend rearward substantially horizontally, and a spare tire pan 8 is formed downward at the rear floor 7.

Figure 4:
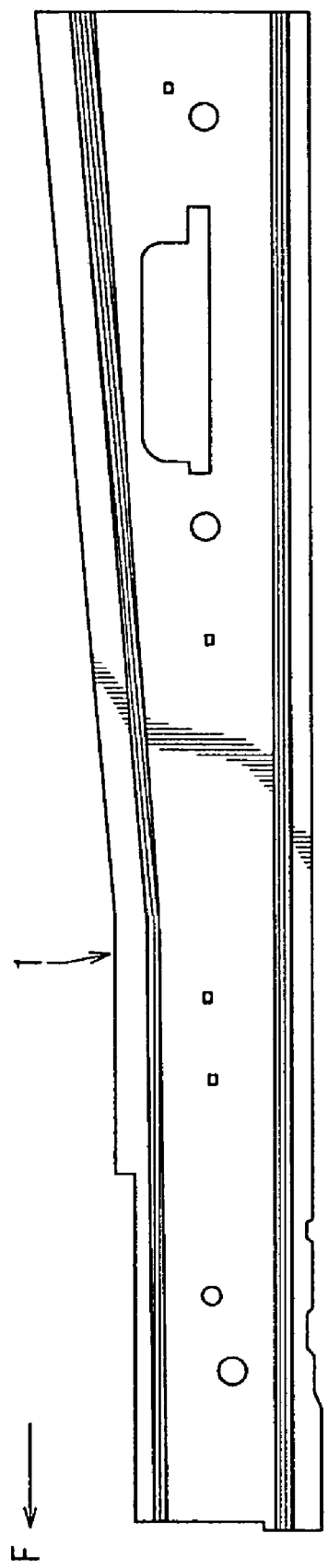
FIG. 4 is a side view of a side sill.

FIG. 4 is a side view of the side sill 1, when viewed from inside the vehicle. The side sill 1 is formed in such a manner that its rear is gradually higher than its front, and the structure with the side sill 1 increases the body rigidity. The side sill inner, illustrated, and a side sill outer, not illustrated, are connected to each other to form the side sill 1, and the side sill 1 constitutes a body rigidity member with a side-sill closed cross section that extends longitudinally. A side-sill reinforcement may be provided between the side sill inner and the side sill outer at need.

As shown in FIGS. 1-3, there is provided a seat support member outer 9 to support a seat 25 (see FIG. 13) that extends longitudinally inside each of the side sills 1.

Figure 5:
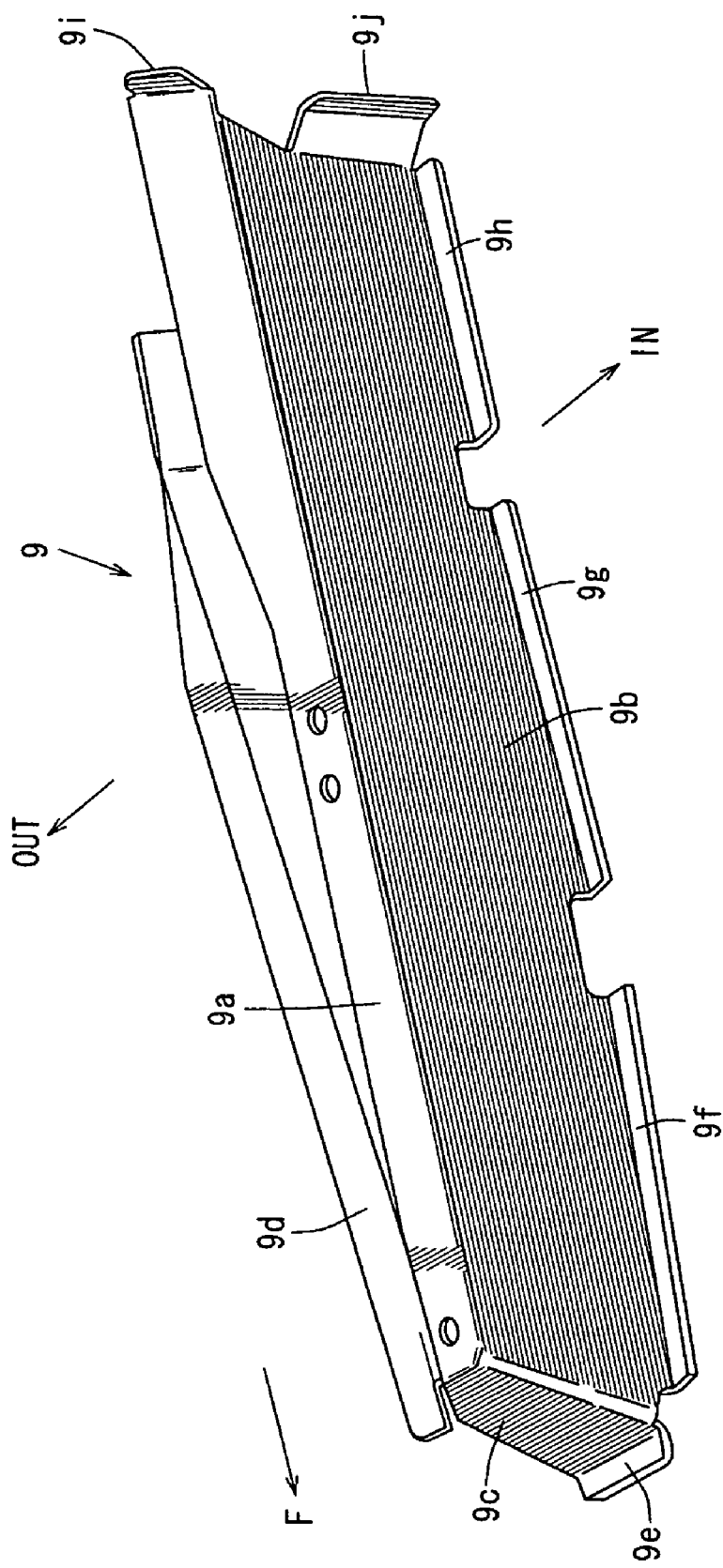
FIG. 5 is a perspective view of a seat support member outer.
Figure 6:
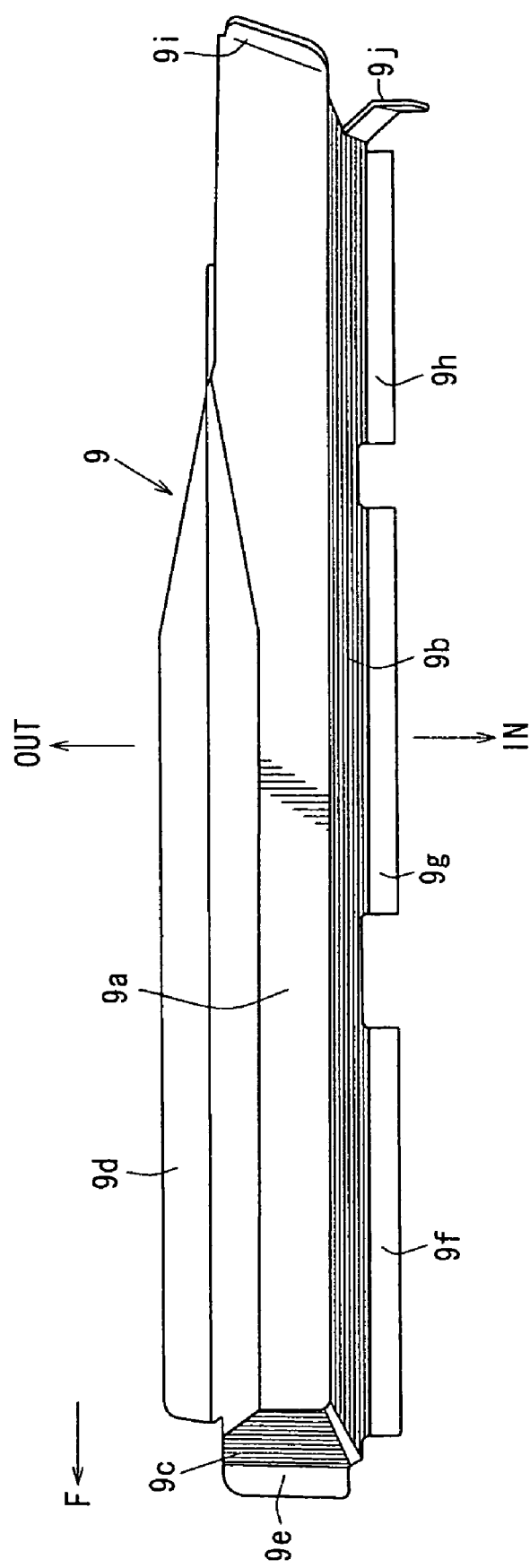
FIG. 6 is a plan view of the seat support member outer.

FIG. 5 is a perspective view of the seat support member outer 9 that is located on the right side of the vehicle, and FIG. 6 is a plan view of that member 9. The seat support member outer 9 comprises a flat-shaped upper piece 9a, a side piece 9b that extends downward from an inside portion of the upper piece 9a, a front piece 9c that interconnects the upper piece 9a and the side piece 9b at the front, a connecting piece 9d that is formed by being bent from the upper piece 9a for a fixation to the side sill inner, connecting pieces 9e, 9f, 9g, 9h that are formed respectively by being bent from the front piece 9c and the side piece 9b, and connecting pieces 9i, 9j that are formed by being bent from rear portions of the upper piece 9a and the side piece 9b for a fixation to the front wall 5a of the kick-up portion 5. These pieces 9a-9j are integrally formed of a metal plate with a pressing process.

As illustrated in FIGS. 1-3, the connecting piece 9d is fixed to the side sill 1, the connecting pieces 9e, 9f, 9g, 9h are fixed to the floor panel 2, and the connecting pieces 9i, 9j are fixed to the front wall 5a of the kick-up portion 5, respectively. Thereby, the seat support member outer 9 is attached to the inside the side sill 1.

Herein, the left-side seat support member outer 9 is provided in the same manners as the right-side seat support member outer 9. Therefore, the same portions are illustrated with the same reference characters.

Along the tunnel member 4 and the tunnel portion 3 is provided a seat support member inner 10 that extends longitudinally and supports the seat 25 (see FIG. 13) as shown in FIG. 1-3.

Figure 7:
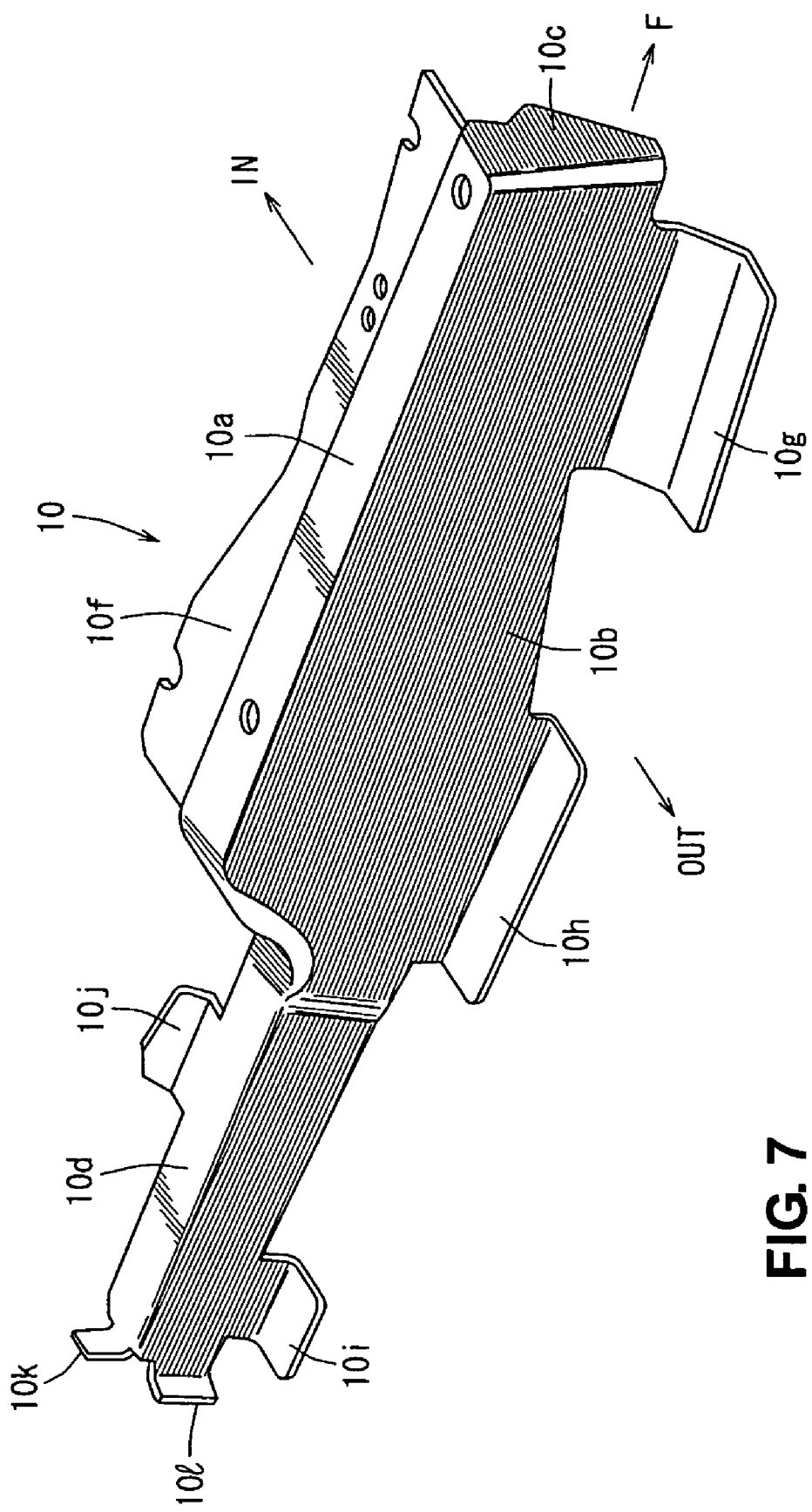
FIG. 7 is a perspective view of a seat support member inner.
Figure 8:
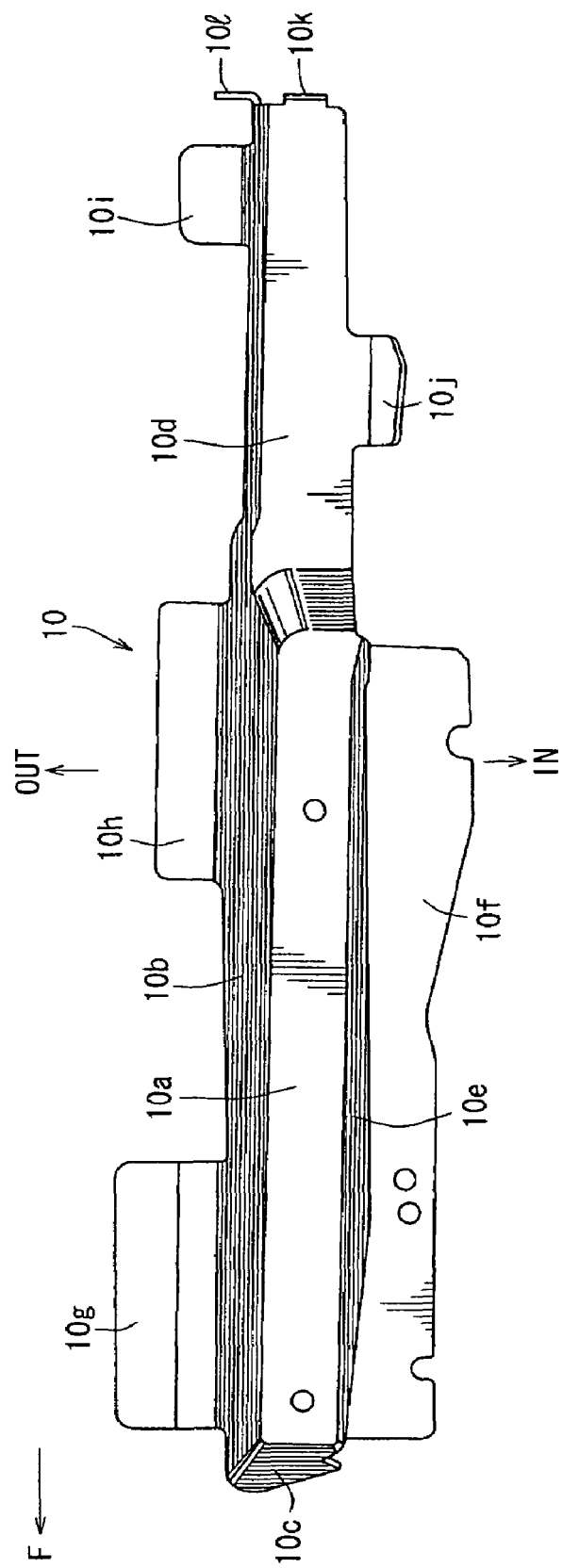
FIG. 8 is a plan view of the seat support member inner.

FIG. 7 is a perspective view of the seat support member inner 10 that is located on the right side of the vehicle, and FIG. 8 is a plan view of that member 10. The seat support member inner 10 comprises a flat-shaped upper piece 10a, a side piece 10b that extends downward from an outside portion of the upper piece 10a, a front piece 10c that interconnects the upper piece 10a and the side piece 10b at the front, an extending piece 10d that extends reward from a main body portion of the seat support member inner 10 and has a L-shaped cross section, a connecting piece 10f that is formed inside the upper piece 10a via a difference-in-level piece 10e by being bent from the upper piece 10a for a fixation to the tunnel member 4, connecting pieces 10g, 10h, 10i that are formed respectively by being bent from the side piece 10b and a side portion of the extending piece 10d, a connecting piece 10j that is formed by being bent from an upper portion of the extending piece 10d for a fixation to the tunnel member 4, and connecting pieces 10k, 10l that are formed by being bent from a rear end of the extending piece 10d for a fixation to the front wall 5a of the kick-up portion 5. These pieces 10a-10l are integrally formed of a metal plate with a pressing process.

As illustrated in FIGS. 1-3, the connecting piece 10f, 10j are fixed to the tunnel portion 3 via the tunnel member 4, the connecting pieces 10g, 10h, 10i are fixed to the floor panel 2, the connecting pieces 10k, 10l are fixed to the front wall 5a of the kick-up portion 5, respectively. Thereby, the seat support member inner 10 is attached to the tunnel portion 3 via the tunnel member 4.

Herein, the left-side seat support member inner 10 is provided in the same manners as the right-side seat support member inner 10. Therefore, the same portions are illustrated with the same reference characters.

Further, as shown in FIGS. 1-3, there are provided cross members 11, 12 that extend in a vehicle width direction so as to have a specified distance therebetween longitudinally. Their outside end portions are respectively connected to the side piece 9b of the seat support member outer 9, and their inside end portions are connected to the side piece 10b of the seat support member inner 10.

The front-side cross member 11 (so-called No. 2 cross member) has connecting pieces 11a, 11b that extend in the vehicle width direction, as shown in FIG. 3, which are fixed to the floor panel 2.

Likewise, the rear-side cross member 12 (so-called No. 2.5 cross member) has connecting pieces 12a, 12b that extend in the vehicle width direction, as shown in FIG. 3, which are fixed to the floor panel 2.

Figure 9:
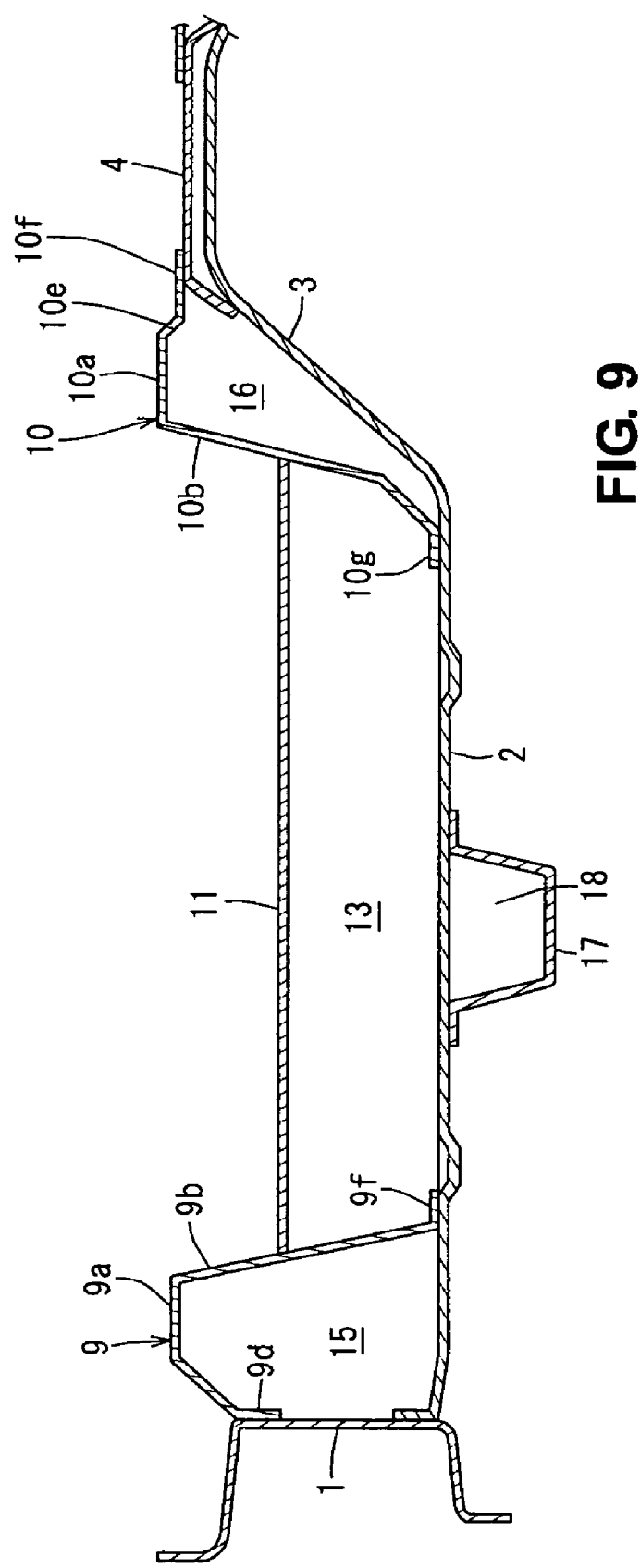
FIG. 9 is a sectional view taken along line A-A of FIG. 3.
Figure 10:
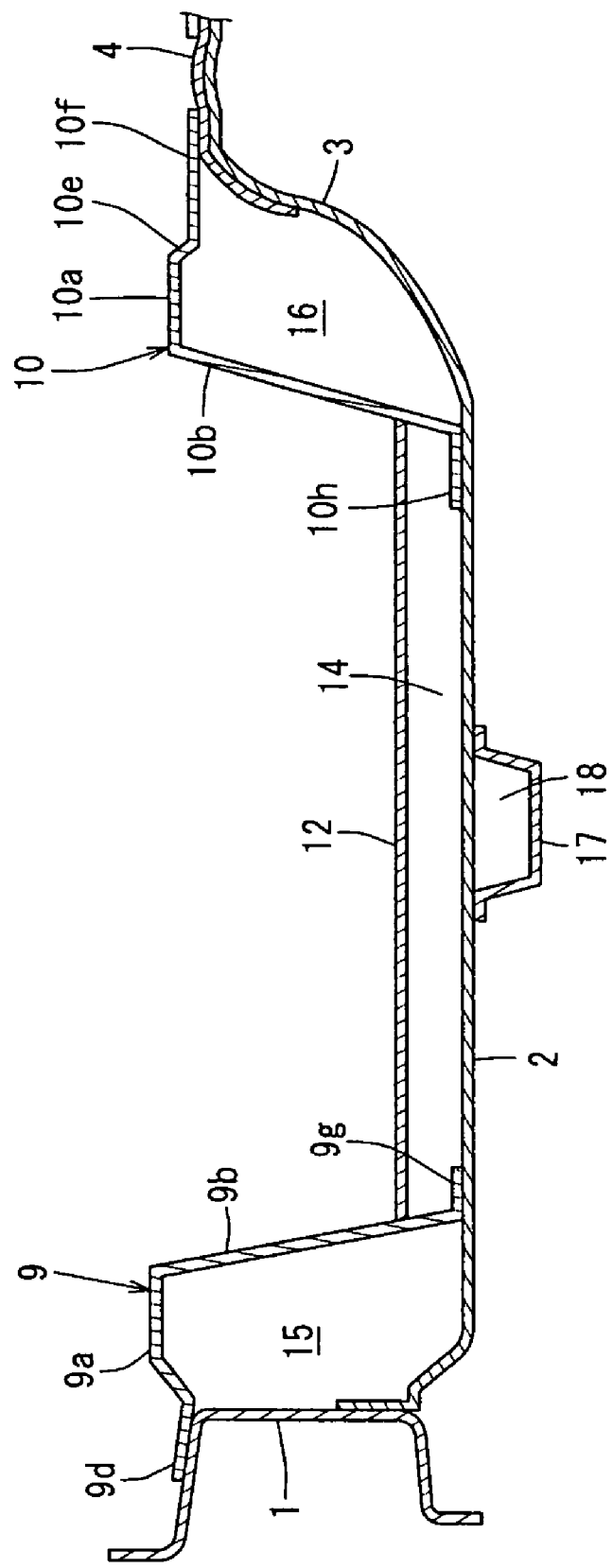
FIG. 10 is a sectional view taken along line B-B of FIG. 3.
Figure 11:
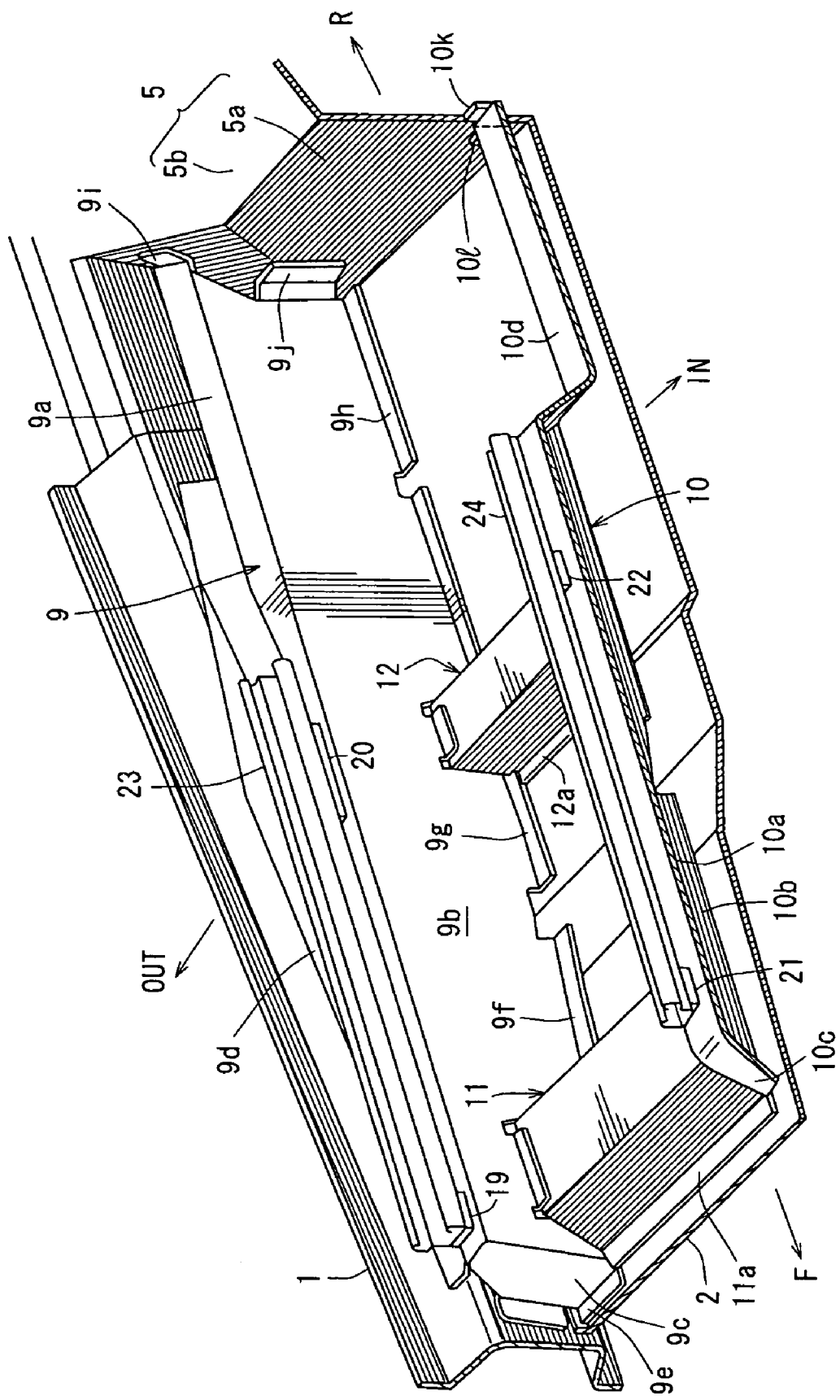
FIG. 11 is a perspective sectional view taken along line C-C of FIG. 3.
Figure 12:
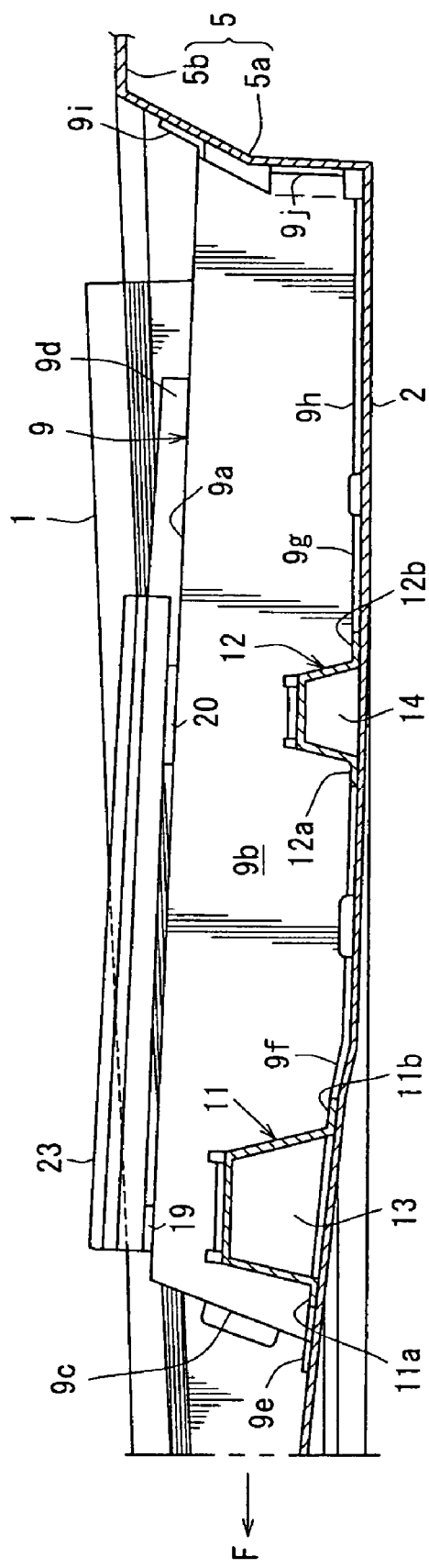
FIG. 12 is a sectional view taken along line D-D of FIG. 3.

FIG. 9 is a sectional view taken along line A-A of FIG. 3, FIG. 10 is a sectional view taken along line B-B of FIG. 3, FIG. 11 is a perspective sectional view taken along line C-C of FIG. 3 and FIG. 12 is a sectional view taken along line D-D of FIG. 3. Herein, a closed cross section 13 extending in the vehicle width direction (see FIG. 9) is formed between the cross member 11 and the floor panel 2, and a closed cross section 14 extending in the vehicle width direction (see FIG. 10) is formed between the cross member 12 and the floor panel 2.

The cross section of the cross member 12 (No. 2.5 cross member) located at a rear side has a smaller area than that of the cross member 11 (No. 2 cross member) located at a front side. Thereby, a sufficiently large foot space for a passenger seated in the rear seat can be ensured.

Further, as shown in FIGS. 9 and 10, a closed cross section 15 is formed so as to extend longitudinally by the side sill 1, the seat support member outer 9, and the floor panel 2, while a closed cross section 16 is formed so as to extend longitudinally by the tunnel member 4, the tunnel portion 3, and the seat support member inner 10. These structures with the closed cross sections can increase the rigidity of the lower vehicle body structure properly.

Further, as shown in FIGS. 9 and 10, to a lower face of the floor panel 2 is connected a floor frame 17 that is located at a middle portion between the side sill 1 and the tunnel portion 3. Thereby, a closed cross section 18 is formed by the floor frame 17 and the floor panel 2, and this structure with the closed cross section can increase the rigidity of the lower vehicle body structure.

Herein, as shown in FIGS. 11 and 12, seat rails 23, 24 extending longitudinally are respectively attached to the flat-shaped upper pieces 9a, 10a of the members 9, 10 via spacers 19, 20 and 21, 22. Specifically, the seat rails 23, 24 are fixed to the respective members 9, 10 via members, such as bolts and nuts, at attaching locations of the respective spacers 19, 20, 21, 22. And, the seat 25 (front seat) is attached to the seat rails 23, 24 so that its position is adjustable longitudinally as shown in FIG. 13.

The seat 25 comprises a seat cushion 26, a seat back 27, and a headrest 28. The seat back 27 includes a retractor 30 to wind up a seatbelt 29 therein. Thus, the seat 25 (front seat) constitutes a so-called belt-in seat structure.

Figure 13:
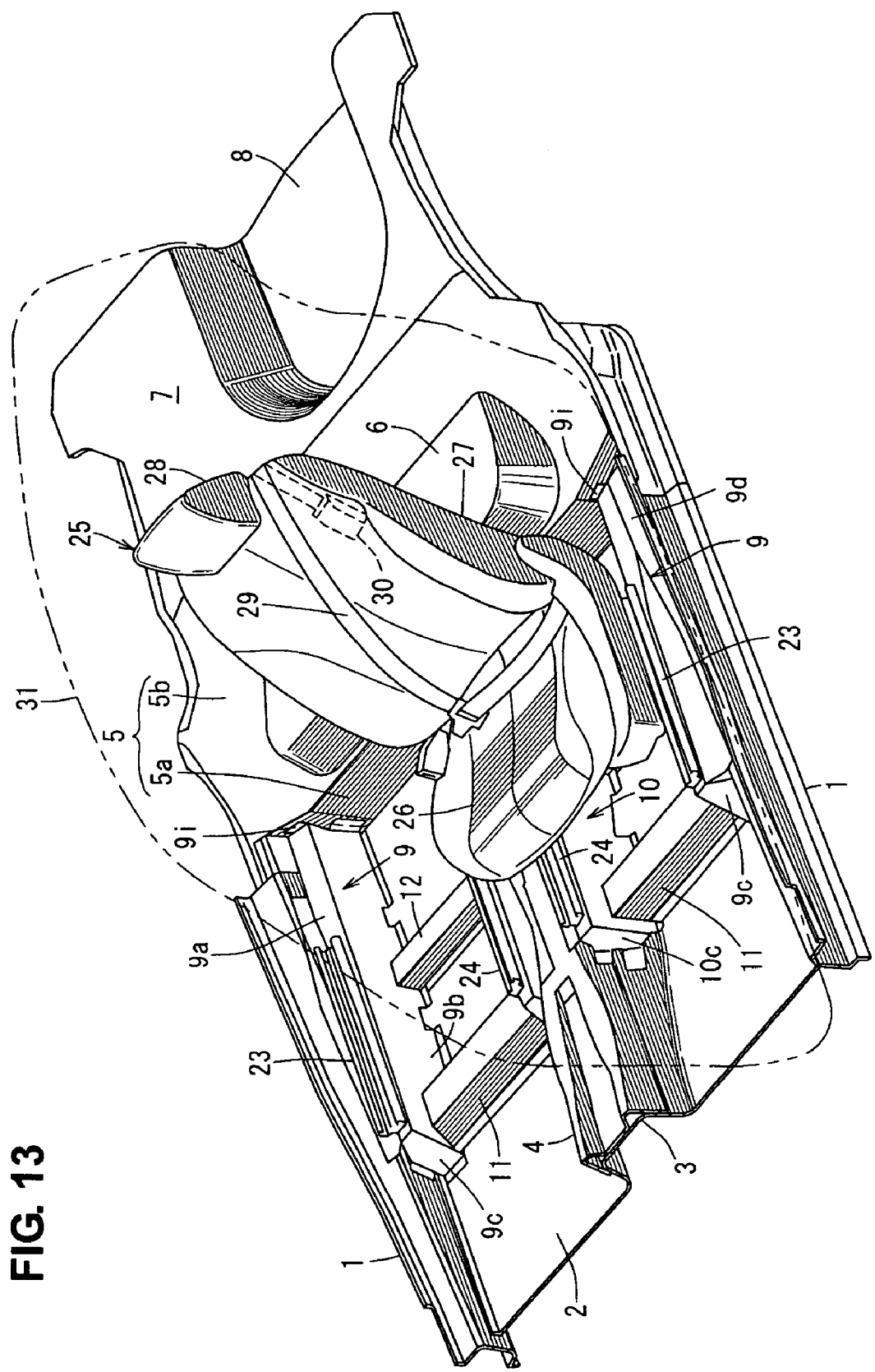
FIG. 13 is a perspective view of the lower vehicle body structure with a seat.

Also, as shown in FIG. 13, an ingress and egress opening 31 without a partition is formed beside the floor panel 2, thereby constituting a door opening of a so-called center pillar-less door. In the figures, an arrow F shows a forward direction, an arrow R shows a rearward direction, an arrow IN shows an inward direction, and an arrow OUT shows an outward direction of the vehicle.

As described above, according to the lower vehicle body structure of a vehicle of the embodiment shown in FIGS. 1-13, in which the floor panel 2 is provided between a pair of side sills 1, 1 extending longitudinally, the tunnel portion 3 extending longitudinally is provided at the central portion of the floor panel 2, and the seat 25 for the passenger is provided between the side sill 1 and the tunnel portion 3, there are provided the seat support member outer 9 to support the seat 25, which extends longitudinally inside the side sill 1, and the plurality of cross members 11, 12 extending in the vehicle width direction with the specified distance therebetween longitudinally, outside end portions of which are respectively connected to the seat support member outer 9 and inside end portions of which are respectively connected to the tunnel portion 3.

According to the above structure, since the seat support member outer 9 is configured such that it extends longitudinally inside the side sill 1 (vehicle body rigidity member) and the seat 25 is attached to the seat support member outer 9, the seat 25 can be provided with the properly increased rigidity.

Also, since the plural cross members 11, 12 (vehicle body rigidity member) are provided between the seat support member outer 9 and the tunnel portion 3 (vehicle body rigidity member) with the specified distance therebetween longitudinally, the vehicle body rigidity can be ensured against the vehicle side crash. Namely, both the proper layout of the seat 25 and the sufficient vehicle body rigidity at the vehicle side crash can be provided.

Further, since loads applied to the seat 25 and seatbelt 29 are configured to be transmitted to the seat support member outer 9, side sill 1, cross members 11, 12 and tunnel portion 3 (vehicle body rigidity members), the cross members 11, 12 can be properly prevented from being improperly deformed at the vehicle side crash.

Also, there is further provided the seat support member inner 10 to support the seat 25, which extends longitudinally along the tunnel portion 3, wherein the inside end portions of the cross members 11, 12 are connected to the tunnel portion 3 via the seat support member inner 10.

Thereby, since the plural cross members 11, 12 provided with the specified distance therebetween longitudinally are connected to the seat support member outer 9 provided along the side sill 1 and the seat support member inner 10 provided along the tunnel portion 3, the rigidity of the vehicle body rigidity can be increased and the resistance against the vehicle side crash can be properly improved. Also, since the seat 25 is attached to the seat support member outer 9 and the seat support member inner 10, the attaching rigidity of the seat 25 can be increased.

Also, the cross members 11, 12 are configured such that the cross section of the one 12 (No. 2.5 cross member) located at the rear side has the smaller area than that 11 (No. 2 cross member) of the one located at the front side.

Thereby, since the cross member 12 is made smaller, ensuring the layout of the seat 25 and the sufficient vehicle body rigidity against the vehicle side crash, the sufficiently large foot space for the passenger seated in the rear seat can be ensured.

Further, the seat rails 23, 24 for the seat 25 are attached to the seat support member outer 9 and the seat support member inner 10.

Thereby, the seat rails are attached for the slide-type seat 25, and both the seat slide and the sufficient vehicle body rigidity can be attained. In particular, since the seat rails 23, 24 are respectively attached to the seat support member outer 9 and the seat support member inner 10 that extend longitudinally, fixing of the seat rails 23, 24 to a proper position can be attained even if they are fixed to plural portions via members such as bolts and nuts.

In addition, there is provided the tunnel member 4 extending longitudinally along the tunnel portion 3, and the seat support member inner 10 is connected to the floor panel 2 and the tunnel member 4.

Thereby, since the seat support member inner 10 is connected to the floor panel 2 and the tunnel member 4 that can increase rigidities of the floor and the vehicle body, the attaching rigidity of the seat 25 and the vehicle body rigidity against the vehicle side crash can be further increased.

Also, at the rear portion of the floor panel 2 is provided the kick-up portion 5 to project upward, and a rear end portion of the seat support member outer 9 is connected to the front wall 5a of the kick-up portion 5.

Thereby, since the seat support member outer 9 is connected to the kick-up portion 5 having the high rigidity, the vehicle body rigidity can be further increased, and the loads applied to the seat 25 and seatbelt 29 can be transmitted not only to the seat support member outer 9, side sill 1, cross members 11, 12, tunnel portion 3, but also to the kick-up portion 5. Further, the above seat support member outer 9 is connected to the side sill 1 and the kick-up portion 5, which are the vehicle body rigidity members, the sufficient vehicle body rigidity can be ensured.

Likewise, at the rear portion of the floor panel 2 is provided the kick-up portion 5 to project upward, and a rear end portion of the seat support member inner 10 is connected to the front wall 5a of the kick-up portion 5.

Thereby, since the seat support member inner 10 is connected to the kick-up portion 5 having the high rigidity, the vehicle body rigidity can be further increased, and the loads applied to the seat 25 and seatbelt 29 can be transmitted not only to the seat support member outer 9, seat support member inner 10, side sill 1, cross members 11, 12, tunnel portion 3, but also to the kick-up portion 5. Further, the above seat support member inner 10 is connected to the tunnel portion 3 and the kick-up portion 5, which are the vehicle body rigidity members, the sufficient vehicle body rigidity can be ensured.

Further, the ingress and egress opening 31 without the partition is formed beside the floor panel 2.

The ingress and egress opening 31 without the partition, namely without a center pillar, can provide passengers with easy ingress and egress, but the vehicle body rigidity may be deteriorated by providing the ingress and egress opening 31 without the partition. However, the desirable vehicle body rigidity can be ensured by applying the above-described structure.

Also, the seat 25 includes the retractor 30 to wind up the seatbelt 29 therein.

Thereby, even if the seat 25 equipped with the retractor 30 to wind up the seatbelt 29, namely, a belt-in type of seat, is applied, the loads applied to the seat 25 and seatbelt 29 can be properly transmitted to the seat support member outer 9, side sill 1, cross members 11, 12, tunnel portion 3 that are vehicle body rigidity members.

Figure 14:
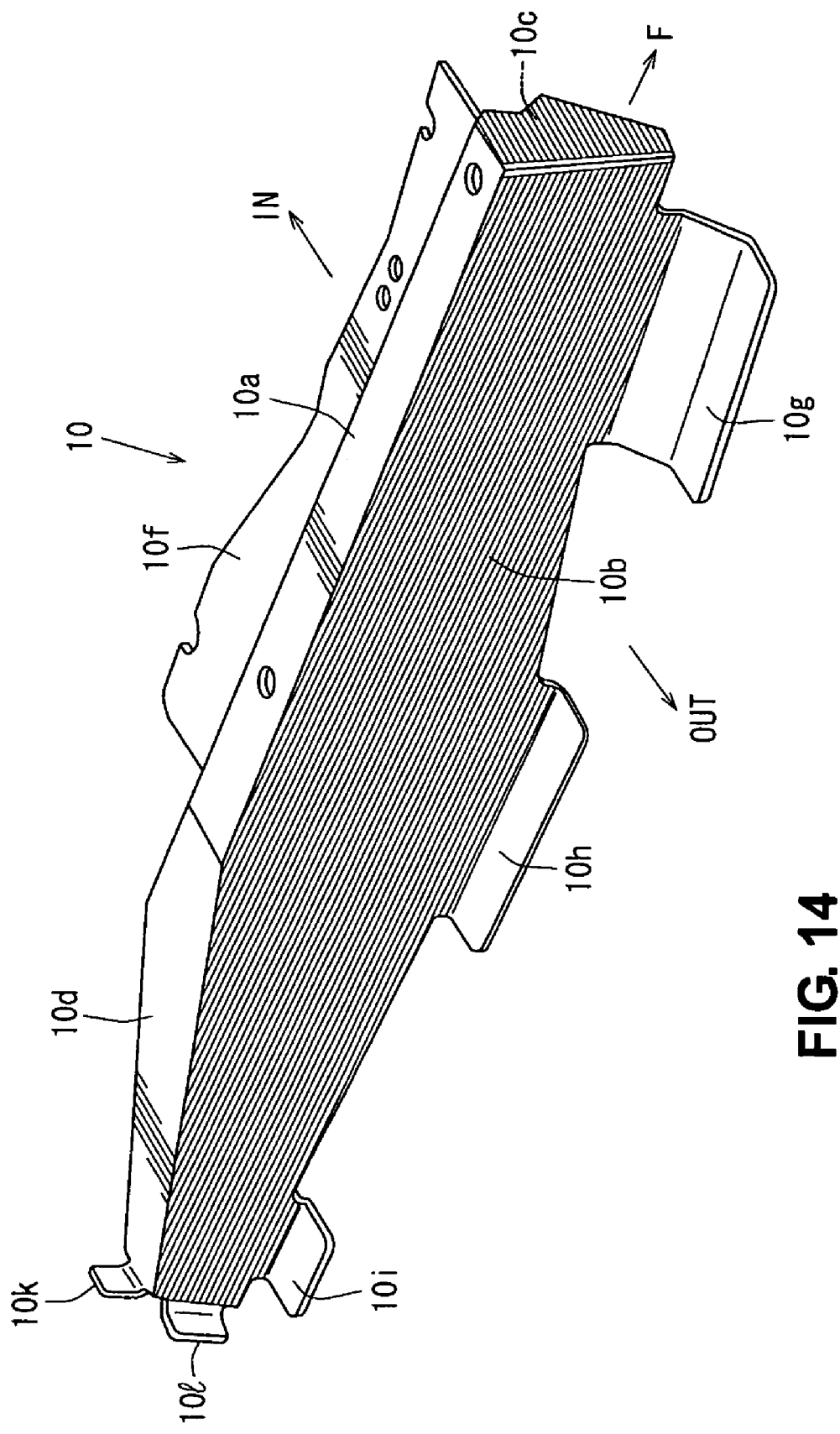
FIG. 14 is a perspective view of a seat support member inner of another embodiment.

FIG. 14 shows another embodiment of the seat support member inner 10. Although the seat support member inner 10 shown in FIG. 7 has the difference-in-level-shaped extending piece 10d extending reward from the main body portion of the seat support member inner 10, the seat support member inner 10 of the present embodiment shown in FIG. 14 has a slants-shaped extending piece 10d that extends reward slantingly from the main body portion of the seat support member inner 10.

The present embodiment of FIG. 14 performs substantially the same function and effects as the previous embodiment of FIG. 7. Herein, the same components are denoted by the same reference characters as the one shown in FIG. 7, omitting detailed descriptions of those.

Figure 15:
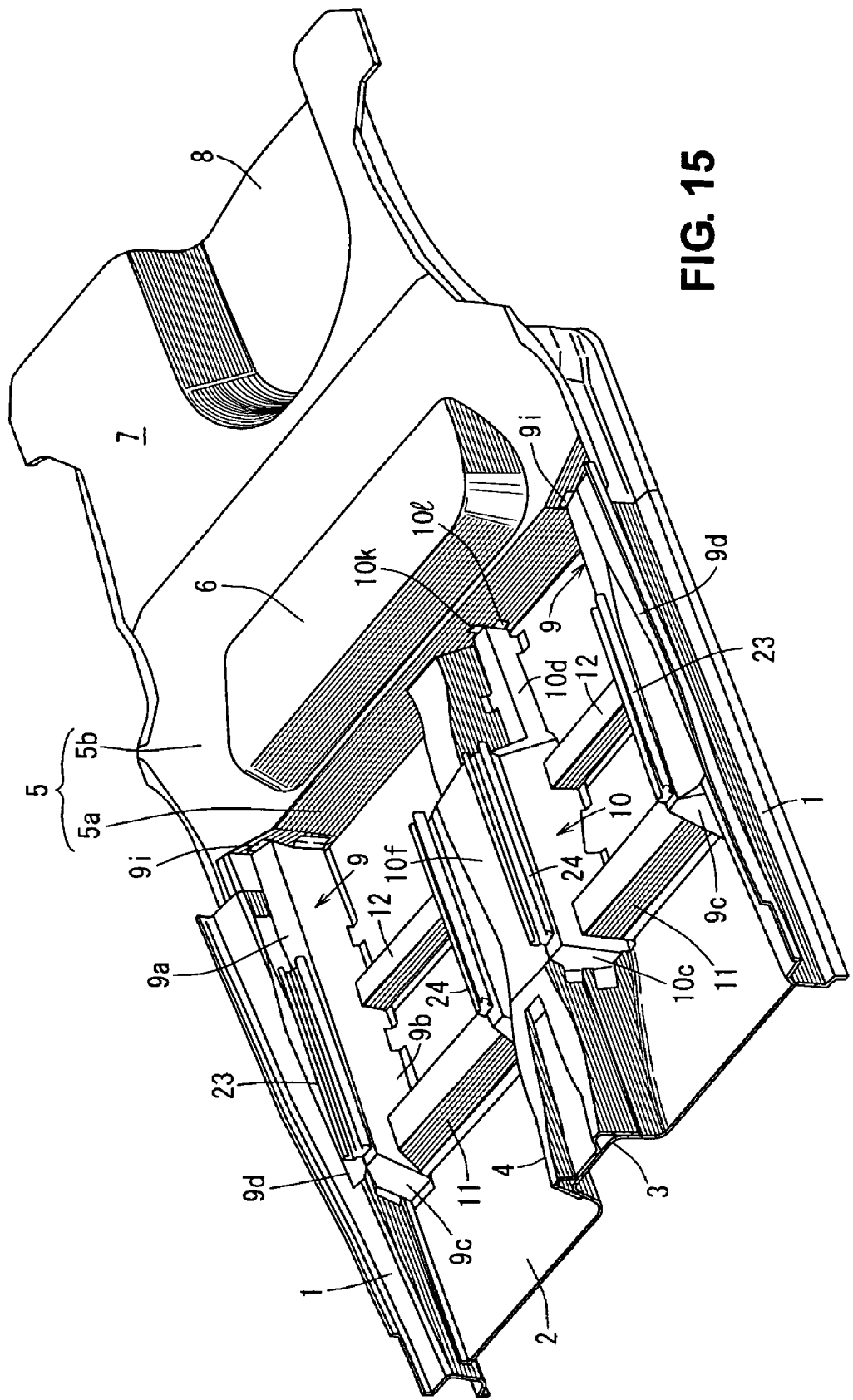
FIG. 15 is a perspective view of a lower vehicle body structure of a vehicle of further another embodiment.
Figure 16:
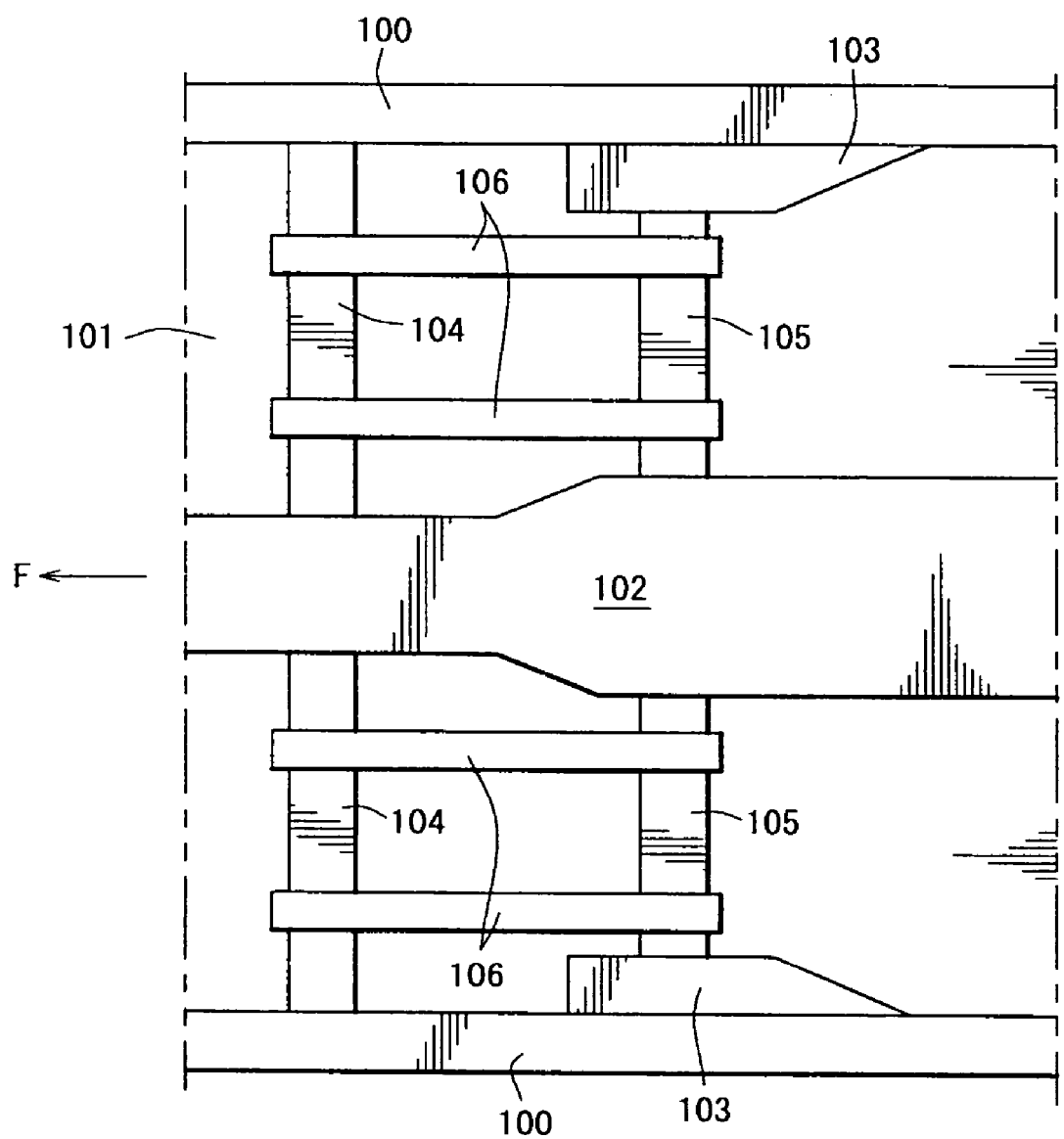
FIG. 16 is a plan view of a conventional structure.

Also, as shown in FIG. 15, both of the seat support member inners 10, 10 may be constituted integrally as a single member, so that the number of parts can be reduced.

The present invention should not be limited to the above-described embodiments, and any other modifications and improvements may be applied within the scope of a sprit of the present invention.

What is claimed is:

1. A lower vehicle body structure of a vehicle, in which a floor panel is provided between a pair of side sills extending longitudinally, a tunnel portion extending longitudinally is provided at a central portion of the floor panel, and a seat for a passenger is provided between the side sill and the tunnel portion, the lower vehicle body structure comprising:

a seat support member outer to support the seat, which extends longitudinally inside the side sill and is connected to the side sill, the seat support member outer comprising an upper piece for forming an upper wall portion thereof, a side piece that extends downward from an inside portion of the upper piece for forming a side wall portion thereof, a front piece that interconnects the upper piece and the side piece for forming a front wall portion thereof, a connecting piece that is fixed to the side sill, another connecting piece that is fixed to the floor panel, and further another connecting piece that is fixed to a rear kick-up portion that is provided so as to project upward at a rear portion of the floor panel, an outside seat rail for supporting the seat being attached on the upper piece of the seat support member outer so as to extend rearward substantially from a front end portion of the seat support member outer;

a seat support member inner to support the seat, which extends longitudinally along the tunnel portion and is connected to the tunnel portion, the seat support member inner comprising an upper piece for forming an upper wall portion thereof, a side piece that extends downward from an outside portion of the upper piece for forming a side wall portion thereof, a front piece that interconnects the upper piece and the side piece for forming a front wall portion thereof, a connecting piece that is fixed to the tunnel portion, another connecting piece that is fixed to the floor panel, and further another connecting piece that is fixed to the rear kick-up portion of the floor panel, an inside seat rail for supporting the seat being attached on the upper piece of the seat support member inner so as to extend rearward substantially from a front end portion of the seat support member inner; and a plurality of cross members extending in a vehicle width direction with a specified distance therebetween longitudinally, outside end portions of which are respectively connected to the side piece of the seat support member outer and inside end portions of which are respectively connected to the the side piece of the seat support member inner.

2. The lower vehicle body structure of a vehicle of claim 1, wherein the cross members are configured such that a cross section of the one located at a rear side has a smaller area than that of the one located at a front side.

3. The lower vehicle body structure of a vehicle of claim 1, wherein an ingress and egress opening without a partition of a center pillar is formed beside the floor panel.

4. The lower vehicle body structure of a vehicle of claim 1, wherein the seat includes a retractor to wind up a seatbelt therein.

5. The lower vehicle body structure of a vehicle of claim 1, wherein the cross members arc configured such that a height of the one located at a rear side is lower than that of the one located at a front side, and a cross section of the one located at the rear side has a smaller area than that of the one located at the front side.

6. The lower vehicle body structure of a vehicle of claim 1, wherein the seat support member inner is configured such that a width of a rear portion thereof is narrower than that a front portion thereof.

7. The lower vehicle body structure of a vehicle of claim 1, wherein the cross members are configured such that the one located at a front side is connected to the front end portions of the seat support outer and the seat support inner.

* * * * *